United States Patent

Garza et al.

[11] Patent Number: 6,097,296
[45] Date of Patent: Aug. 1, 2000

[54] APPARATUS AND METHOD FOR DETECTING TORNADOES

[76] Inventors: Santos Garza, 819 Sycamore Creek, Allen, Tex. 75002; Cloves Rinn Cleavelin, 4425 78th St., Lubbock, Tex. 79424

[21] Appl. No.: 09/138,937

[22] Filed: Aug. 24, 1998

[51] Int. Cl.$^7$ ........................................... G01W 1/00
[52] U.S. Cl. ................ 340/601; 340/690; 73/170.16
[58] Field of Search ............................ 340/600, 601, 340/522, 690; 73/170.16, 170.24

[56] References Cited

U.S. PATENT DOCUMENTS

| | | | |
|---|---|---|---|
| 2,928,277 | 3/1960 | Cavanagh | 73/170 |
| 3,245,078 | 4/1966 | Kohl | 343/112 |
| 3,646,540 | 2/1972 | Cooper | 340/522 |
| 3,753,117 | 8/1973 | Downing | 73/170.24 |
| 3,810,137 | 5/1974 | Bacon | 340/600 |
| 4,055,830 | 10/1977 | Wilson et al. | 367/128 |
| 4,602,248 | 7/1986 | Foster | 340/601 |
| 4,632,052 | 12/1986 | Green | 116/70 |
| 5,355,350 | 10/1994 | Bass | 367/13 |
| 5,379,025 | 1/1995 | Tatom | 340/601 |
| 5,546,800 | 8/1996 | Daniel | 73/170.16 |
| 5,771,020 | 6/1998 | Markson et al. | 342/460 |
| 5,801,636 | 9/1998 | Tatom et al. | 340/690 |

*Primary Examiner*—Jeffery A. Hofsass
*Assistant Examiner*—Van T. Trieu
*Attorney, Agent, or Firm*—Santos Garza

[57] ABSTRACT

A tornado detector comprising a sensor (30) for sensing the presence of sound having a frequency of about one hertz and for providing a sound sense signal in response thereto, a filter (50) to attenuate said sound sense signal wave components having frequencies greater than those which correspond to sound having a frequency of about one hertz, and an alarm (101) for generating an alarm signal in response to said filtered sound sense signal.

28 Claims, 6 Drawing Sheets ps://6,097,296

APPARATUS AND METHOD FOR DETECTING TORNADOES

BACKGROUND—FIELD OF INVENTION

This invention generally relates to the remote detection of a tornado, and more particularly to the sensing of very low frequency sound, filtering to isolate the very low frequency sound emissions associated with a tornado, and generating an alarm signal based on those sensed very low frequency sound emissions.

BACKGROUND—SCOPE OF BACKGROUND ART

Tornadoes are naturally occurring weather phenomena, which has taken many lives and caused much injury in the world. Advanced localized detection of approaching tornadoes allows people to seek adequate shelter to reduce the possibility of injury or death for themselves and their families.

Television news stations and the National Weather Service continuously watch their US radar's for signs of tornadoes and conditions that are conducive to the formation of tornadoes. The National Weather Service issues tornado watches and warnings to the radio and television-viewing public. These watches and warnings usually have a granularity which allows warnings to specific counties within various viewing areas. The ability to know of approaching tornadoes then depends on the person being awake and actively viewing the television or listening to the radio. If the power has been interrupted as frequently occurs during tornadoes then the additional component of having a battery powered television or radio and actively tracking National Weather Service reports further decreases the margin of safety experienced in the event of being in the path of an approaching tornado. If the person does not have a television or radio tuned in to reports from the National Weather Service then local community sirens are the last lines of warning defense. Assuming that the warning siren is functional, that it has been activated and that the siren is heard and understood to mean that a tornado is approaching and to take shelter immediately. For many individuals the chance of finding adequate shelter may have already passed by the time an approaching tornado has been identified.

Tornadoes emit various electromagnetic, pressure and acoustic signatures. Reliably identifying tornado emission signatures within a prescribed area around the detector has been met heretofore with only marginal success. The major success limitations have been due to identifying signatures which falsely indicate the presence of a tornado when some other weather phenomena is occurring, and identifying a tornado at a range that allows sufficient time to find adequate shelter. Other tornado detector success limitations have been designing a detector that is compact, self-contained and simple to install. U.S. Pat. No. 5,355,350 to Henry E. Bass, Haiping Yan (Oct. 11, 1994) uses a passive acoustical receiver to detect approaching tornadoes it relies on sensing sound frequencies that have a large attenuation that translates to a very short detection range. This device allowing the user only thirty to sixty seconds to find adequate shelter after detection of an approaching tornado. Many may not find a one-minute warning sufficient to locate adequate shelter for themselves and their families, especially if the alarm occurs at night. U.S. Pat. No. 3,245,078 to Douglas A. Kohl (Apr. 05, 1966) this device uses an electromagnetic emission tracking system. In this system the number of pulses greater than a predetermined magnitude received from a given source are measured. In this device the distance of the weather electromagnetic emission source is not measured. Using this device to detect the presence of approaching tornadoes for warning would be marginally beneficial since the distance from the tornado to the detector is not measured. U.S. Pat. No. 3,753,117 to George C. Downing, Thomas V. McEwen (Aug. 14, 1973) this device measures unfiltered electromagnetic emissions from weather storms by the use of an external antenna, amplifying and integrating the signal from the antenna and triggering an alarm if the electrical activity exceeds a predetermined set point. Since the measured emissions are unfiltered, the device is not specifically sensing for the presence of a tornado and it is possible to falsely alarm indicating an approaching tornado when in fact the device may be detecting either multiple lightening strikes or other non-tornado electromagnetic emissions. U.S. Pat. No. 3,810,137 to Kenneth H. Bacon, Jr., Kenneth H. Bacon, Sr. (May 4, 1974) this device detects the immediate presence of an amplitude modulated electromagnetic signal at 53.25 megahertz carrier frequency. The signal detected by this device is not analyzed to determine the characteristic nearly continuous presence of tornado electromagnetic emissions. It is possible that since the device indicates instantaneous presence of a signal on the 53.25 megahertz carrier wave the device may be falsely triggered by individual lightening strikes and thus falsely indicates an approaching tornado. U.S. Pat. No. 3,646,540 to Roy L. Cooper, Lynn F. Laseman (Feb. 29, 1972) this device uses a photoelectric sensor to determine brightness variations on a television set to station 2, and an aneroid switch which arms the alarm when it measures low barometric pressure. Moderate winds accompanying an approaching storm may arm the alarm and single or multiple lightening strikes may cause flashes on the television screen and trigger the alarm, thus falsely indicating the presence of a tornado. U.S. Pat. No. 4,632,052 to Marion Green (Dec. 30, 1986) this alarm is a simple mechanical device that measures the drop in barometric pressure associated with an approaching tornado. A decrease of barometric pressure may also accompany an approaching storm with moderate winds, thus the device could indicate a false tornado alarm in such situations. Due to its mechanical nature it may malfunction if the whistle clogs with dust. U.S. Pat. No. 4,602,248 to Michael L. Foster, Harold L. Foster, Michael A. Powers (Jul. 22, 1986) this device uses an electrical pressure transducer to measure the decreasing barometric pressure associated with an approaching tornado. This device suffers from the possibility of false alarms due to the barometric pressure falling caused by approaching thunderstorms with moderate winds and indicating an approaching tornado. U.S. Pat. No. 2,928,277 to Robert Terrance Cavanagh (Mar. 15, 1960) in this device the mechanism of tornado detection is to measure wind velocity and air density by use of sonic transmitters and microphones arranged in a closed geometric loop. The problems associated with this design is that weather phenomena other than tornadoes generate high winds and low barometric pressure, such as an approaching thunderstorm with moderate winds. Thus possibly triggering a false alarm. U.S. Pat. No. 5,546,800 to Bernard Daniel (Aug. 20, 1996) in this device two external ion flow meters measure negative ions to determine whether conditions are conducive to the formation of a tornado. This device measures whether tornado formations may occur, not the actual existence of a formed tornado. This is of marginal value since alarming for a condition conducive to the formation of a tornado does not mean that a tornado has formed or will form, only that it may form. U.S. Pat. No. 5,379,025 to Frank B. Tatom and Stanley J. Vitton (Jan. 3, 1995) in this device a geophone is used to measure seismic surface waves associated with a tornado. The device may falsely trigger for some seismic event condition other than the approach of a tornado, such as construction or roadwork, which would affect seismic readings for the surrounding area.

The present invention, in contrast, for the first time uses the fact that tornadoes emit unique infrasound emissions as a basis for detecting tornadoes and generating the alarm signal. The infrasound emission of tornadoes is characteristic and unique. No other known weather condition emits this signature and detecting this signature permits reliable detection of tornadoes. The localized detection of tornadoes is made possible by utilizing a relatively simple passive infrasound receiver located within an existing structure.

OBJECTS AND ADVANTAGES

It is accordingly an object of the invention to provide a tornado detector that reliably indicates the localized presence of a tornado.

A further object is to provide a tornado detector that minimizes the occurrence of false tornado detection alarms.

Another object of the invention is to provide a tornado detector that provides sufficiently advanced warning of the presence of a localized tornado so that individuals may locate adequate shelter.

These objectives are achieved, in accordance with the preferred embodiment of the invention, by sensing the infrasound emissions associated with a tornado, and generating the alarm signal based on those sensed emissions.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentality's and combinations particularly pointed out in the appended claims.

BRIEF SUMMARY OF THE INVENTION

The invention provided is a tornado detector, which senses 1 Hz infrasound emissions of tornadoes in air and generates the alarm signal, thus providing advanced warning of the approach of tornadoes. The detector is compact, self-contained and simple to install.

Figure 1:
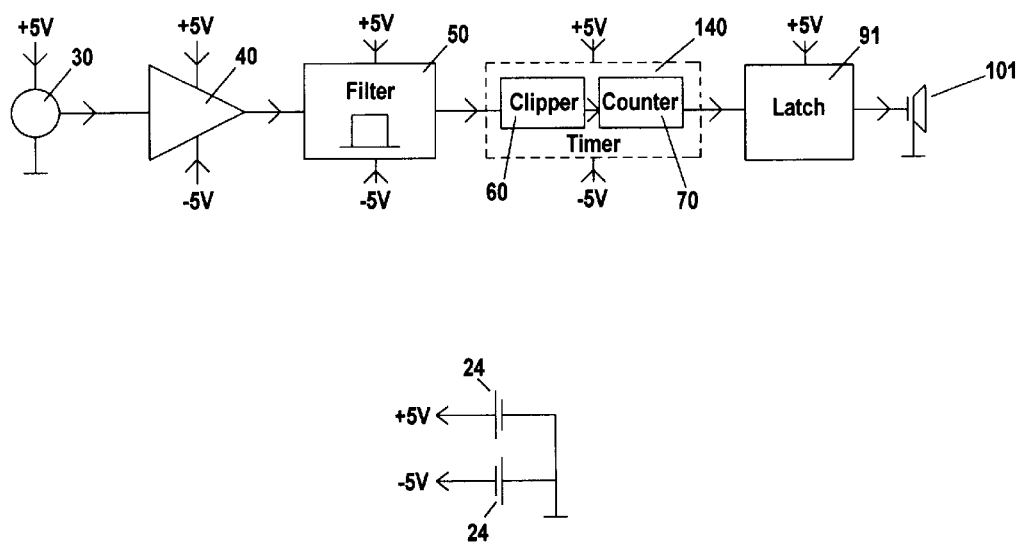
FIG. 1 is a block diagram of a tornado identification circuit for the preferred infrasound tornado detector.

REFERENCE NUMERALS 20 ac-dc converter
21 transformer
22 rectifier circuit
23 voltage regulation circuit
24 batteries
30 infrasound sensor circuit
31 condenser microphone (electret WM-60AT)
40 amplifier circuit
41 audio amplifier (LM386N)
50 filter circuit
51 operational amplifier configured as a band pass filter (LM1458N)
60 clipper circuit
61 operational amplifier configured as a signal clipper (LM1458N)
70 counter circuit
71 dual 4-bit binary counter (74HCT393)
80 trigger circuit
81 AND gate circuit (74HCT08)
82 OR gate circuit (74HCT32)
91 latch (SCR—silicon controlled rectifier)
101 audio alarm
110 mid-frequency radio frequency detector circuit
111 operational amplifier (LM1458N)
112 audio amplifier (LM386N)
113 antenna
120 analyzer circuit
121 operational amplifier configured as an integrator circuit (LM1458N)
130 very high frequency radio frequency detector circuit
131 audio amplifier (LM386N)
133 antenna
140 timer circuit
C1 capacitor (100 $\mu$F)
C2 capacitor (0.1 $\mu$F)
C3 capacitor (100 $\mu$F)
C4 capacitor (0.1 $\mu$F)
C5 capacitor (22 $\mu$F)
C6 capacitor (0.1 $\mu$F)
C7 capacitor (22 $\mu$F)
C8 capacitor (0.1 $\mu$F)
C9 capacitor (1 $\mu$F)
C10 capacitor (33 $\mu$F)
C11 capacitor (10 $\mu$F)
C12 capacitor (0.05 $\mu$F)
C13 capacitor (10 $\mu$F)
C14 capacitor (10 $\mu$F)
C15 capacitor (1 $\mu$F)
C16 capacitor (1 $\mu$F)
C17 capacitor (10 $\mu$F)
C18 capacitor (1 $\mu$F)
C20 capacitor (15 pF)
C21 capacitor (0.1 $\mu$F)
C22 capacitor (220 $\mu$F)
C23 capacitor (10 $\mu$F)
C24 capacitor (220 $\mu$F)
C25 capacitor (0.047 $\mu$F)
D1 diode (1N4001)
D2 diode (1N4001)
D3 diode (1N4001)
D4 diode (1N4001)
D5 diode (1N4001)
D9 zener diode (1N4729A)
D10 zener diode (1N4729A)
D11 germanium diode (1N34A)
D12 germanium diode (1N34A)
IC1 positive voltage regulator circuit (LM340T-5.0)
IC2 negative voltage regulator circuit (LM79M05)
L1 tapped inductor (82 nH)

L2 tapped inductor (0.6 μH)
R1 resistor (2.2 K-ohm)
R2 resistor (15 K-ohm)
R3 resistor (330 K-ohm)
R4 resistor (1 K-ohm)
R5 resistor (10 K-ohm)
R6 resistor (1 K-ohm)
R7 resistor (1 K-ohm)
R8 resistor (4.7 K-ohm)
R9 resistor (4.7 K-ohm)
R10 resistor (47 K-ohm)
R11 resistor (10 K-ohm)
VR1 potentiometer (10 K-ohm)
VR2 potentiometer (100 K-ohm)
VR3 potentiometer (10 K-ohm)
VR4 potentiometer (10 K-ohm)

PREFERRED EMBODIMENT—DESCRIPTION, FIGS. 1 AND 2

Tornadoes emit very low frequency sounds that are unique and may be readily identified. This very low frequency sound is referred to as infrasound. The infrasound signature given off by tornadoes is a sound wave of about one hertz in frequency, in essence, one oscillation per second. Infrasound also has the attribute that it travels for extended distances. Thus, this present invention detects tornadoes up to twenty miles away and gives users up to thirty minutes of warning time.

As shown in FIG. 1, the infrasound tornado detector has an infrasound sensor circuit 30, for sensing the presence of sound having a frequency of about one hertz and providing a sound sense signal in response thereto. An amplifier circuit 40 responsive to infrasound sensor circuit 30 for amplifying the sound sense signal received from infrasound sensor circuit 30 so that an amplified sound sense signal may be more readily filtered and timed. A filter circuit 50 responsive to amplifier circuit 40 for filtering the amplified sound sense signal by attenuating wave components having frequencies greater than those which correspond to sound having a frequency of about one hertz and by attenuating wave components having frequencies less than those which correspond to sound having a frequency of about one hertz. A timer circuit 140 responsive to filter circuit 50 for timing the duration of the sound sense signal and providing a timed sound sense signal. Timer circuit 140 includes a counter circuit 70 responsive to a clipper circuit 60 in the present example. Clipper circuit 60 responsive to filter circuit 50 receives a filtered sound sense signal that is sinusoidal in shape and squares the signal by clipping the signal peaks and valleys, thus producing a squared sound sense signal that is approximately square wave shaped. Counter circuit 70 responsive to clipper circuit 60 for counting the number of cycles of the squared sound sense signal by incrementing the counter based on the sharp squared edges of the squared sound sense signal. Counter circuit 70 provides the timed sound sense signal when a predetermined count has been reached, which in this example is 64. A latch 91 responsive to counter circuit 70 for latching and conducting a latch signal when the timed sound sense signal is received from counter circuit 70. An audio alarm 101 responsive to latch 91 for generating the alarm signal when the latch signal is present.

Figure 2:
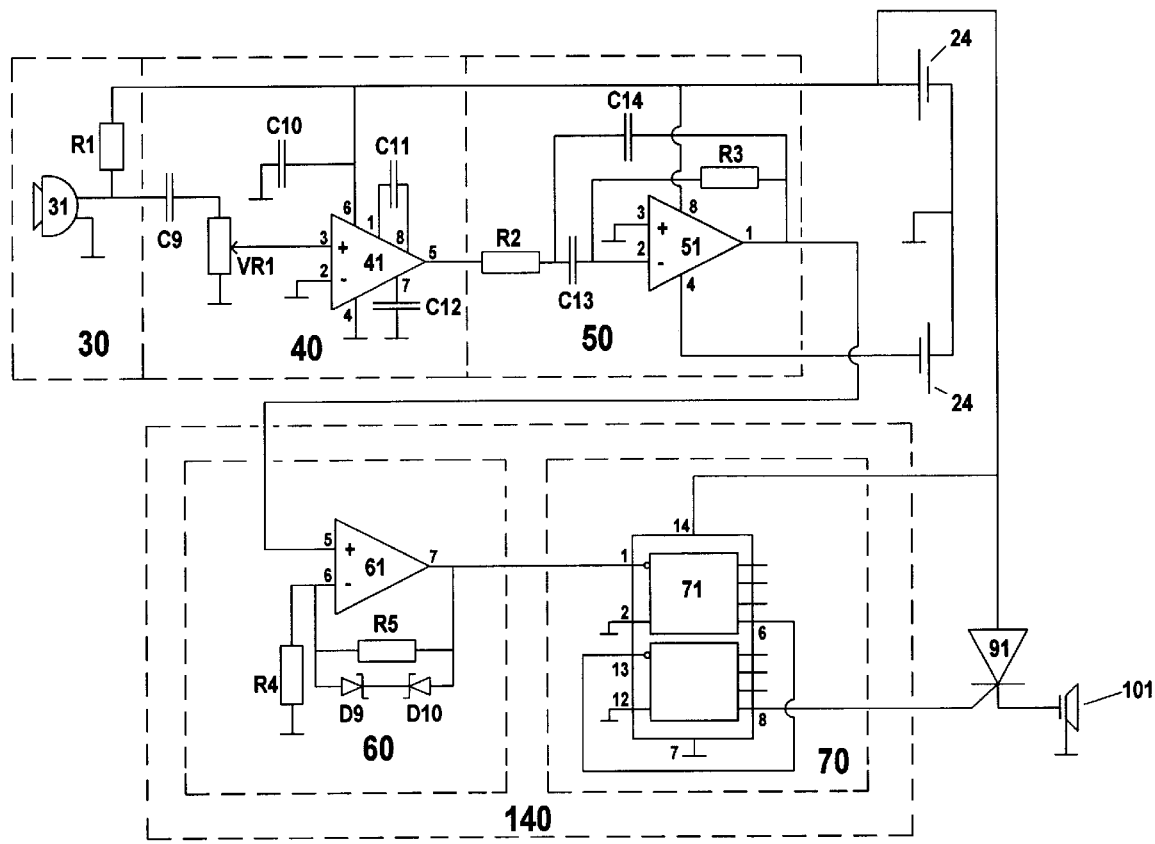
FIG. 2 is a detailed diagram of the tornado identification circuit of FIG. 1.

The complete circuit diagram is shown in FIG. 2. The incoming infrasound signal is received by a condenser microphone 31, which in the illustrated example is a Panasonic omnidirectional back electret condenser microphone cartridge model number WM-60AT, manufactured by Panasonic Industrial Company, having an address of Electronic Components Group, Two Panasonic Way, Panazip: 7H-1, Secaucus, N.J. 07094. Condenser microphone 31 being able to sense in the infrasound range of about one hertz. Condenser microphone 31 has two connections, a ground connection and a power connection. The microphone ground connection is connected to ground, the microphone power connection is connected to a first terminal of a resistor R1 (2.2K), and a second terminal of resistor R1 is connected to positive voltage by a set of batteries 24. The purpose of resistor R1 is to reduce the voltage supplied to condenser microphone 31. The microphone power connection is additionally connected to a first terminal of a capacitor C9 (1 μF), the purpose of capacitor C9 is to pass fluctuating AC signals but not DC signals. A second terminal of capacitor C9 is connected to a first terminal of a potentiometer VR1 (10K). A second terminal of potentiometer VR1 is connected to ground, a wiper terminal of potentiometer VR1 is connected to a non-inverting input of an audio amplifier 41, which in the present example is an LM386N 400 mW audio amplifier, manufactured by National Semiconductor Corporation, having an address of 2900 Semiconductor Drive, Santa Clara, Cailf. 95052-8090. Potentiometer VR1 shunts a portion of the voltage to ground and part to the non-inverting input of audio amplifier 41 depending on the position of the wiper. An inverting input of audio amplifier 41 is connected to ground so that the voltage amplified is the voltage difference between ground and the voltage at the wiper of potentiometer VR1. A power supply connection of audio amplifier 41 has a parallel connection to a first terminal of a capacitor C10 (33 μF) and to batteries 24. A second terminal of capacitor C10 is connected to ground. A ground connection of audio amplifier 41 is connected to ground. A bypass connection of audio amplifier 41 is connected to a first terminal of a capacitor C12 (0.05 μF), a second terminal of capacitor C12 is connected to ground. A first gain connection of audio amplifier 41 is connected to a first terminal of a capacitor C11 (10 μF), a second gain connection of audio amplifier 41 is connected to a second terminal of capacitor C11. An operational amplifier configured as a band pass filter 51, which in this example is an LM1458N dual operational amplifier, manufactured by National Semiconductor Corporation, having an address of 2900 Semiconductor Drive, Santa Clara, Calif. 95052-8090 is responsive to audio amplifier 41. Said band pass filtering operational amplifier 51 being configured in the following way, an output of audio amplifier 41 is connected to a first terminal of a resistor R2 (15K), a second terminal of resistor R2 is connected to a first terminal of two parallel capacitors, a capacitor C13 (10 μF) and a capacitor C14 (10 μF). A second terminal of capacitor C13 is connected to an inverting input of band pass filtering operational amplifier 51. A first terminal of a resistor R3 (330K) is connected to the inverting input of band pass filtering operational amplifier 51 a second terminal of resistor R3 is connected to an output of band pass filtering operational amplifier 51. A second terminal of capacitor C14 is connected to the output of band pass filtering operational amplifier 51. A non-inverting input of band pass filtering operational amplifier 51 is connected to ground. Operational amplifier power is provided by voltage output from batteries 24. The output of the band pass filtering operational amplifier 51 is connected to a non-inverting input of an operational amplifier configured as a signal clipper 61, which in this example is an LM1458N dual operational amplifier, manufactured by National Semiconductor Corporation, having an address of 2900 Semiconductor Drive, Santa Clara, Calif. 95052-8090. An inverting input of clipping operational amplifier 61 is connected to an anode of a zener diode D9 that in this example is a 1N4729A, available from Microsemi, having an address of 6 Lake Street, Lawrence, Mass. 01841. A cathode of zener diode D9 is connected to a cathode of a zener diode D10 that in this example is a 1N4729A, available from Microsemi, having an address of 6 Lake Street, Lawrence, Mass. 01841. An anode of zener diode D10 is connected to an output of clipping operational amplifier 61. A first terminal of a resistor R5 (10K) is connected to the anode of zener diode D9 and a second terminal of resistor R5 is connected to the anode of zener diode D10. The inverting input of clipping operational 61 is additionally connected to a first terminal of a resistor R4 (1K), a second terminal of resistor R4 is connected to ground. The output of clipping operational amplifier 61 is connected to a first clock pulse input of a dual 4-bit binary ripple counter 71, which in this example is a 74HCT393, manufactured by Harris Semiconductor, having an address of 17000 Dallas Parkway, Suite 205, Dallas, Tex. 75248. A first output of dual 4-bit binary ripple counter 71 is connected to a second clock pulse input of dual 4-bit binary ripple counter 71. A pair of master resets for both counters of dual 4-bit binary ripple counter 71 are connected to ground. Positive voltage is provided to dual 4-bit binary ripple counter 71 by positive voltage output of batteries 24. A ground connection of dual 4-bit binary ripple counter 71 is connected to ground. A second output of dual 4-bit binary ripple counter is connected to a gate of latch 91, which is in this example a silicon controlled rectifier having an on-state current of 6 amps and peak reverse voltage of 200 volts. An anode of latch 91 is connected to positive voltage output by batteries 24. A cathode of latch 91 is connected to a power input connection of audio alarm 101 and a ground connection of audio alarm 101 is connected to ground.

Preferred Embodiment—Operation, FIGS. 1 and 2

Operation of the device of the present invention will be described further with reference to FIG. 1. Tornadoes emit very low frequency sound that is referred to as infrasound, the frequency of which is about one hertz. The present invention detects tornadoes by sensing the infrasound emissions associated with the tornado, and generating the alarm signal based on those sensed emissions.

As indicated in FIG. 1, the infrasound emitted by tornadoes is sensed by infrasound sensor circuit 30 which senses the presence of sound having the frequency of about one hertz and provides the sound sense signal. Amplifier circuit 40 responsive to the sound sense signal, for amplifying the sound sense signal so that the amplified sound sense signal may be more readily filtered and timed. Filter circuit 50 responsive to the amplified sound sense signal, for filtering by attenuating wave components having frequencies greater than those which correspond to sound having the frequency of about one hertz and attenuating wave components having frequencies less than those which correspond to sound having the frequency of about one hertz. The filtered sound sense signal is sinusoidal in shape and modifying the shape of the filtered sound sense signal more readily allows counting the number of filtered sound sense signal cycles. The number of sound sense cycles is directly related to the duration of the sound sense signal. Timer circuit 140 responsive to the filtered sound sense signal for timing the duration of the sound sense signal and providing the timed sound sense signal. Timer circuit 140 including counter circuit 70 responsive to clipper circuit 60 in the present example. Clipper circuit 60 is responsive to the filtered sound sense signal. Clipper circuit 60 receives the filtered sound sense signal which is sinusoidal in shape and by clipping the signal peaks and valleys thus squares the filtered sound sense signal and produces the squared sound sense signal that is approximately square wave shaped. The squared sound sense signal having sharp corners that can be used to increment counter circuit 70. When the predetermined number of squared sound sense signal cycles has been counted, which in this example is 64, the counter provides the timed sound sense signal to latch 91. Latch 91 responsive to the timed sound sense signal for providing the latch signal, enabling power to be sent to audio alarm 101.

Other Embodiments

Figure 3:
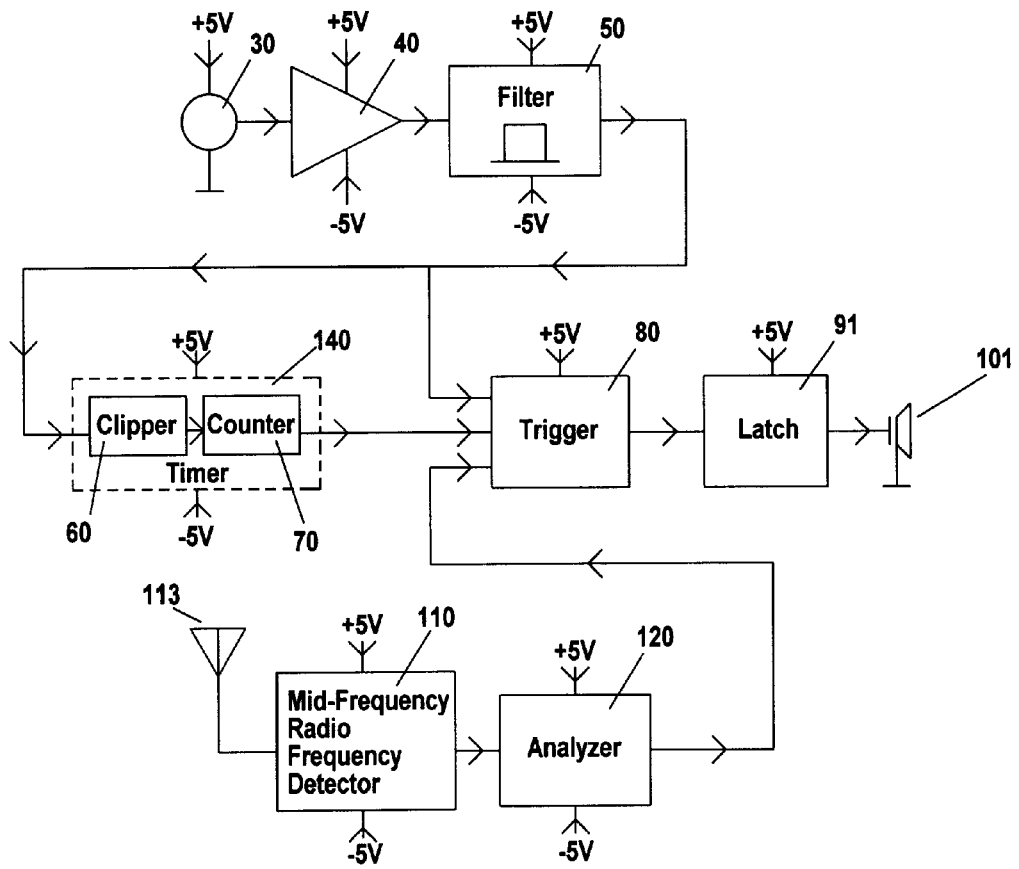
FIG. 3 is a block diagram of a tornado identification circuit for a second embodiment of the infrasound tornado detector that includes a mid frequency radio frequency detector.
Figure 3:
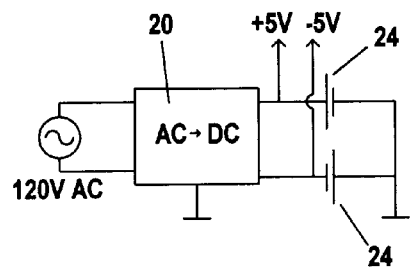
Figure 4:
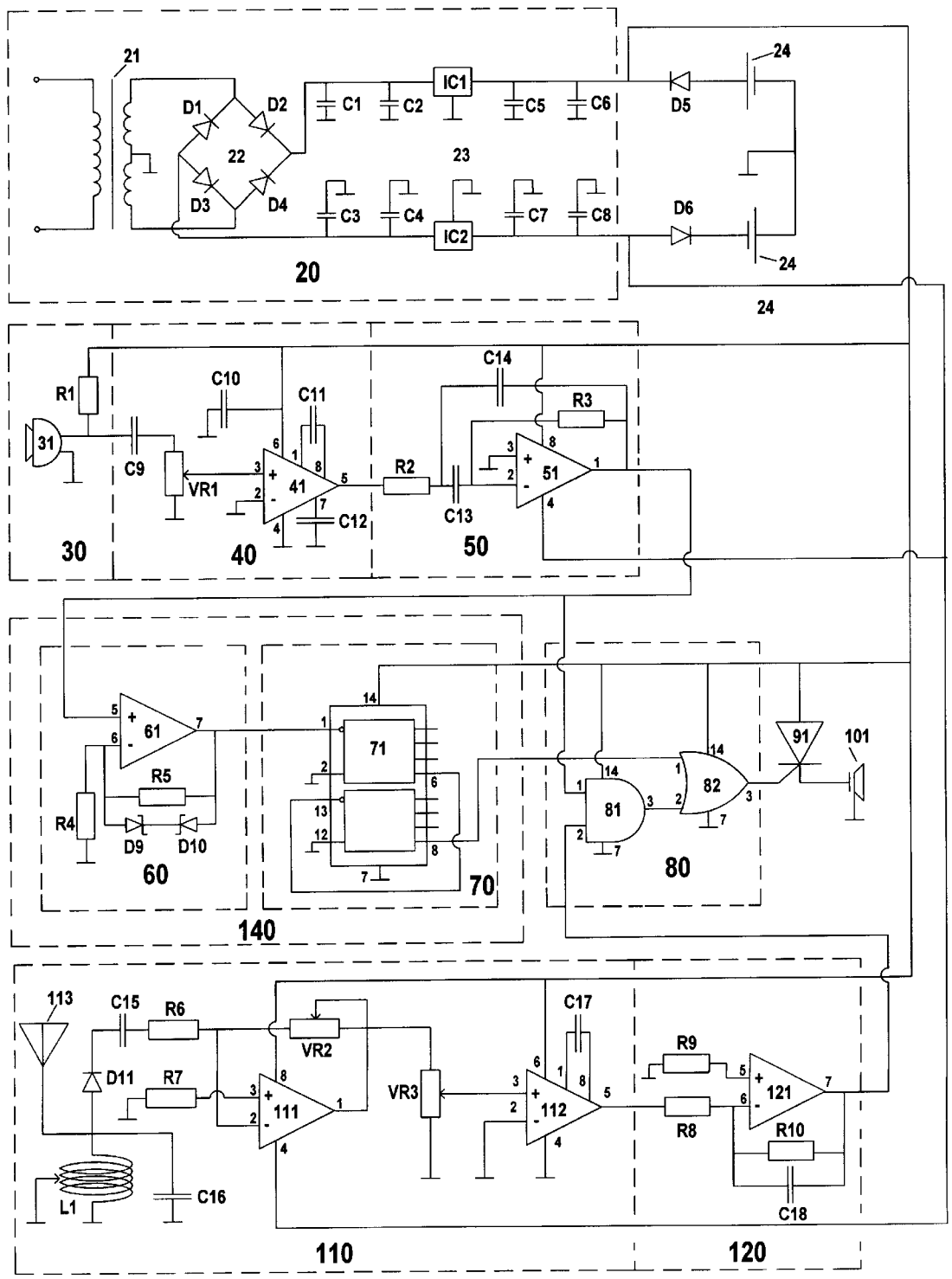
FIG. 4 is a detailed diagram of the tornado identification circuit of FIG. 3.

Infrasound and Mid Frequency—Radio Frequency Tornado Detector—Description, FIGS. 3 and 4

As shown in FIG. 3, the infrasound tornado detector has infrasound sensor circuit 30, which acts as the sensor for sensing the presence of sound having the frequency of about one hertz, which is the very low frequency sound that tornadoes emit. Amplifier circuit 40 responsive to infrasound sensor circuit 30 for amplifying the sound sense signal received from infrasound sensor circuit 30 so that the amplified sound sense signal may be more readily filtered and timed. Filter circuit 50 is responsive to amplifier circuit 40 for filtering the amplified sound sense signal by attenuating wave components having frequencies greater than those which correspond to sound having the frequency of about one hertz and attenuating wave components having frequencies less than those which correspond to sound having the frequency of about one hertz. Timer circuit 140 responsive to filter circuit 50 for timing the duration of the sound sense signal and providing the timed sound sense signal. Timer circuit 140 includes counter circuit 70 responsive to clipper circuit 60 in the present example. Clipper circuit 60 responsive to filter circuit 50 for receiving the filtered sound sense signal which is sinusoidal in shape and clipping the filtered sound sense signal peaks and valleys producing the squared sound sense signal that is approximately square wave shaped. Counter circuit 70 responsive to clipper circuit 60 for counting the number of cycles of the squared sound sense signal by incrementing based on the sharp squared edges of the squared sound sense signal and providing the timed sound sense signal when the predetermined count has been reached, which in this example is 64. The number of cycles of the squared sound sense signal and the number of sensed infrasound pulses correlate thus providing the duration of the sound sense signal. A mid-frequency radio frequency detector 110 tuned to about 550 kilohertz to detect the electromagnetic emissions from tornadoes. An analyzer circuit 120 responsive to mid-frequency radio frequency detector circuit 110 for integrating a radio frequency detection signal received from mid-frequency radio frequency detector circuit 110 and providing the analyzed radio frequency signal when the integration value of the integrator reaches a predetermined value. A trigger circuit 80 receives inputs from clipper circuit 60, counter circuit 70 and analyzer circuit 120. Trigger circuit 80 is activated in the event of two conditions, a first trigger condition being when the predetermined number of cycles of the squared sound sense signal has been counted, which in this example is 64, and a second trigger condition being the simultaneous presence of the filtered sound sense signal and the analyzed radio frequency signal. Latch 91 responsive to trigger circuit 80 for latching and conducting the latch signal when a trigger signal is received from trigger circuit 80. Audio alarm 101 responsive to latch 91 for generating the alarm signal when the latch signal is present. Batteries 24, connected in parallel to an AC-DC converter 20 power the circuit power supply. The AC-DC converter 20 has a receptacle to plug into an AC power supply.

As shown in more detail in FIG. 4, the AC-DC converter includes a transformer 21, a rectifier circuit 22 and a voltage regulation circuit 23 including a set of smoothing capacitors C1–C8, a LM340T-5.0 circuit IC1, manufactured by National Semiconductor Corporation, having an address of 2900 Semiconductor Drive, Santa Clara, Calif. 95052-8090, and a LM79M05 circuit IC2, manufactured by National Semiconductor Corporation, having an address of 2900 Semiconductor Drive, Santa Clara, Calif. 95052-8090. Those skilled in the art will appreciate that the respective capacity and resistance values and part identifiers for the components of the AC-DC converter and battery back-up portions of the power supply are optional and form no part of the invention. AC-DC converter 20 includes transformer 21, a transformer secondary winding being center tapped and connected to ground. A first leg of the center tapped secondary winding is connected to a cathode of a diode D1, which in this example is an 1N4001, manufactured by Microsemi, having an address of 6 Lake Street, Lawrence, Mass. 01841. Said first leg of the center tapped secondary winding being additionally connected to an anode of a diode D2, which in this example is a 1N4001, manufactured by Microsemi, having an address of 6 Lake Street, Lawrence, Mass. 01841. A second leg of the center tapped secondary winding is connected to a cathode of a diode D3, which in this example is a 1N4001, manufactured by Microsemi, having an address of 6 Lake Street, Lawrence, Mass. 01841. Said second leg of the center-tapped secondary winding being additionally connected to an anode of a diode D4, which in this example is a 1N4001, manufactured by Microsemi, having an address of 6 Lake Street, Lawrence, Mass. 01841. An anode of diode D1 is connected to an anode of diode D3, the diode inter-anode connection being tapped and forming a negative voltage leg of the power supply. A cathode of diode D2 and a cathode of diode D4 are connected, the diode intercathode connection being tapped and forming a positive leg of the power supply. A set of capacitors consisting of a C1 (100 $\mu$F), a C2 (0.1 $\mu$F), a C5 (22 $\mu$F), a C6 (0.1 $\mu$F) and positive voltage regulator circuit IC1 (LM340T-5.0) forming the voltage regulation circuit for a positive leg of the power supply. Capacitors C1, C2, C5 and C6 each having a first terminal connected to the positive leg of the power supply and each having a second terminal connected to ground. Positive voltage regulator circuit IC1 being connected to the positive voltage leg of the power supply and positive voltage regulator circuit IC1 having a ground connection, connected to ground. A set of capacitors a C3 (100 $\mu$F), a C4 (0.1 $\mu$F), a C7 (22 $\mu$F), a C8 (0.1 $\mu$F) and negative voltage regulator circuit IC2 (LM79M05) forming the voltage regulation circuit for a negative voltage leg of the power supply. Capacitors C3, C4, C7 and C8 each having a first terminal connected to the negative leg of the power supply and each having a second terminal connected to ground. Negative voltage regulator circuit IC2 being connected to the negative voltage leg of the power supply. Negative voltage regulator IC2 having a ground connection, connected to ground. A cathode of a diode D5, which in this example is an 1N4001, manufactured by Microsemi, having an address of 6 Lake Street, Lawrence, Mass. 01841, is connected to the positive voltage leg of the power supply, an anode of diode D5 is connected to a positive terminal of a first battery of batteries 24. An anode of diode D6, which in this example is an 1N4001, is connected to the negative leg of the power supply, a cathode of diode D6 is connected to a negative terminal of a second battery of batteries 24. A negative terminal of the first battery of batteries 24 and a positive terminal of the second battery of batteries 24 being connected forming an inter-battery connection, the inter-battery connection being tapped and being connected to ground. The positive leg of the power supply is tapped for use by the tornado detector circuit between the cathode of diode D5 and the positive leg of the power supply. The negative leg of the power supply is tapped for use by the tornado detector circuit between the anode of diode D6 and the negative leg of the power supply. The incoming infrasound signal is received by condenser microphone 31, which in the illustrated example is the Panasonic omnidirectional back electret condenser microphone cartridge model number WM-60AT, that is able to sense in the infrasound range of about one hertz. Condenser microphone 31 has two connections, the ground connection and the power connection. The microphone ground connection is connected to ground, the microphone power connection is connected to the first terminal of resistor R1 (2.2K), the second terminal of resistor R1 is connected to positive voltage output by AC-DC converter 20 or batteries 24. The purpose of resistor R1 is to reduce the voltage supplied to condenser microphone 31. The microphone power connection is additionally connected to the first terminal of capacitor C9 (1 $\mu$F), the purpose of capacitor C9 is to pass fluctuating AC signals but not DC signals. The second terminal of capacitor C9 is connected to the first terminal of potentiometer VR1 (10K). The second terminal of potentiometer VR1 is connected to ground, the wiper terminal of potentiometer VR1 is connected to the non-inverting input of audio amplifier 41, which in the present example is the LM386N 400 mW audio amplifier. Potentiometer VR1 shunts a portion of the voltage to ground and part to the non-inverting input of audio amplifier 41 depending on the position of the wiper. The inverting input of audio amplifier 41 is connected to ground so that the voltage amplified is the voltage difference between ground and the voltage at the wiper of potentiometer VR1. The power supply connection of audio amplifier 41 has a parallel connection to the first terminal of capacitor C10 (33 $\mu$F) and to positive voltage output by AC-DC converter 20 or batteries 24. The second terminal of capacitor C10 is connected to ground. The ground connection of audio amplifier 41 is connected to ground. The bypass connection of audio amplifier 41 is connected to the first terminal of the capacitor C12 (0.05 $\mu$F), the second terminal of capacitor C12 is connected to ground. The first gain connection of audio amplifier 41 is connected to the first terminal of the capacitor C11 (10 $\mu$F), the second gain connection of audio amplifier 41 is connected to the second terminal of capacitor C11. Band pass filtering operational amplifier 51, which in this example is the LM1458N dual operational amplifier is responsive to audio amplifier 41. The output of audio amplifier 41 is connected to the first terminal of resistor R2 (15K), the second terminal of resistor R2 is connected to the first terminal of two parallel capacitors, capacitor C13 (10 $\mu$F) and capacitor C14 (10 $\mu$F). The second terminal of capacitor C14 is connected to the output of band pass filtering operational amplifier 51. The second terminal of capacitor C13 is connected to the inverting input of the operational amplifier configured as band pass filter 51. The first terminal of resistor R3 (330K) is connected to the inverting input of band pass filtering operational amplifier 51. The second terminal of resistor R3 is connected to the output of band pass filtering operational amplifier 51. The non-inverting input of band pass filtering operational amplifier 51 is connected to ground. Power for band pass filtering operational amplifier 51 is provided by voltage output from AC-DC converter 20, or batteries 24. The output of band pass filtering operational amplifier 51 which in this example is the LM1458N dual operational amplifier configured to clip and amplify the filtered sound sense signal is connected to the non-inverting input of clipping operational amplifier 61. The inverting input terminal of clipping operational amplifier 61 is connected to the anode of zener diode D9, which in this example is an 1N4729A, the cathode of zener diode D9 is connected to the cathode of zener diode D10, which in this example is an 1N4729A, the anode of zener diode D10 being connected to the output of clipping operational amplifier 61. The first terminal of resistor R5 (10K) is connected to the anode of zener diode D9 and the second terminal of resistor R5 is connected to the anode of zener diode D10. The inverting input terminal of the clipping operational amplifier is additionally connected to the first terminal of resistor R4 (1K), the second terminal of resistor R4 is connected to ground. The output of clipping operational amplifier 61 is connected to the first clock pulse input of dual 4-bit binary ripple counter 71 which in this example is the 74HCT393. The first output of dual 4-bit binary ripple counter 71 is connected to the second clock pulse input of dual 4-bit binary ripple counter 71. The master reset of both counters of dual 4-bit binary ripple counter 71 are connected to ground. Dual 4-bit binary counter 71 is connected to positive voltage output by AC-DC converter 20, or batteries 24. The ground connection of the dual 4-bit binary counter is connected to ground. Those skilled in the art will appreciate that a variety of circuits are available which may detect radio frequency waves and that the specific circuitry described is exemplary in nature and should not be limiting. Mid-frequency radio frequency detector 110 includes an antenna 113 connected to a first terminal of a tapped inductor L1 (82 nH), a first terminal of a capacitor C16 (1 μF) and to an anode of a germanium diode D11, which in this example is an 1N34A available from Tandy Corporation, having an address of Ft. Worth, Tex. 76102. Tapped inductor L1 having a second terminal connected to ground, and an inductor tap being connected to ground. Capacitor C16 having a second terminal connected to ground. A cathode of germanium diode D11 is connected to a first terminal of a capacitor C15 (1 μF), a second terminal of capacitor C15 is connected to a first terminal of a resistor R6 (1K). An inverting input of an operational amplifier 111, which in this example is an LM1458N dual operational amplifier, manufactured by National Semiconductor Corporation, having an address of 2900 Semiconductor Drive, Santa Clara, Cailf. 95052-8090, is connected to a second terminal of resistor R6. The second terminal of resistor R6 is additionally connected to a first terminal of a potentiometer VR2 (100K), a wiper terminal of potentiometer VR2 is connected to a second terminal of potentiometer VR2. The second terminal of potentiometer VR2 is additionally connected to an output of operational amplifier 111. A non-inverting input of operational amplifier 111 is connected to a first terminal of a resistor R7 (1K), a second terminal of resistor R7 is connected to ground. Power for operational amplifier 111 is provided by voltage output from AC-DC converter 20, or batteries 24. The output of operational amplifier 111 is additionally connected to a first terminal of a potentiometer VR3 (10K). A second terminal of potentiometer VR3 is connected to ground. A wiper of potentiometer VR3 is connected to a non-inverting input of an audio amplifier 112, which in the present example is an LM386N 400 mW audio amplifier, manufactured by National Semiconductor Corporation, having an address of 2900 Semiconductor Drive, Santa Clara, Cailf. 95052-8090.

An inverting input of audio amplifier 112 is connected to ground. A power supply connection of audio amplifier 112 is connected to positive voltage output by AC-DC converter 20, or batteries 24. A ground connection of audio amplifier 112 is connected to ground. A first gain connection of audio amplifier 112 is connected to a first terminal of a capacitor C17 (10 μF), a second gain connection of audio amplifier 112 is connected to a second terminal of capacitor C17. Analyzer circuit 120 integrates the radio frequency signal that is detected by mid-frequency radio frequency detector circuit 110. Analyzer circuit 120 includes an operational amplifier configured as an integrator circuit 121, which in this example is an LM1458N dual operational amplifier, manufactured by National Semiconductor Corporation, having an address of 2900 Semiconductor Drive, Santa Clara, Cailf. 95052-8090. A non-inverting input of integrating operational amplifier circuit 121 is connected to a first terminal of a resistor R9 (4.7K), a second terminal of resistor R9 is connected to ground. An inverting input of integrating operational amplifier circuit 121 is connected to a first terminal of a resistor R8 (4.7K), a second terminal of resistor R8 is connected to an output of audio amplifier 112. The inverting input of integrating operational amplifier circuit 121 is connected to a first terminal of a resistor R10 (4.7k), a second terminal of resistor R10 is connected to an output of integrating operational amplifier circuit 121. A first terminal of a capacitor C18 (1 μF) is connected to the first terminal of resistor R10, a second terminal of capacitor C18 is connected to the second terminal of resistor R10. Trigger circuit 80 includes an AND gate 81, which in this example is a 74HCT08 quad 2-input AND gate, manufactured by Harris Semiconductor, having an address of 17000 Dallas Parkway, Suite 205, Dallas, Tex. 75248. AND gate 81 has a first input connected to the output of the band pass filtering operational amplifier 51. A second input of AND gate 81 is connected to the output of integrating operational amplifier 121. A power supply connection of AND gate 81 is connected to positive voltage output by AC-DC converter 20 or batteries 24. A ground connection terminal of AND gate 81 is connected to ground. Trigger circuit 80 additionally includes an OR gate 82 which in this example is a 74HCT32 quad 2-input OR gate, manufactured by Harris Semiconductor, having an address of 17000 Dallas Parkway, Suite 205, Dallas, Tex. 75248. OR gate 82 having a first input connected to the output of dual 4-bit binary ripple counter 71. A second input of OR gate 82 is connected to an output from AND gate 81. A power supply connection of OR gate 82 is connected to positive voltage output by AC-DC converter 20 or batteries 24. A ground connection terminal of OR gate 82 is connected to ground. An output of OR gate 82 is connected to the gate of latch 91. The anode of latch 91 is connected to positive voltage output by AC-DC converter 20 or batteries 24. The cathode of latch 91 is connected to the power connection of audio alarm 101 and the ground connection of audio alarm 101 is connected to ground.

Infrasound and Mid Frequency—Radio Frequency Tornado Detector—Operation, FIGS. 3 and 4

Operation of the device of the present invention will be described further with reference to FIG. 3. Tornadoes emit very low frequency sound that is referred to as infrasound; specifically this frequency is about one hertz. Tornadoes also emit mid-frequency radio frequency electromagnetic waves of about 550 kilohertz in frequency. This embodiment of the present invention detects both very low frequency sounds, about one hertz, and mid-frequency radio frequency electromagnetic waves, about 550 kilohertz, both of which are associated with tornadoes. This embodiment of the invention generates the alarm signal when the predetermined number of infrasound oscillations has been counted and when infrasound emissions and mid-frequency radio frequency electromagnetic emissions are simultaneously detected.

As indicated in FIG. 3, infrasound is sensed by infrasound sensor circuit 30 capable of sensing the presence of sound having the frequency of about one hertz and providing the sound sense signal in response thereto. Amplifier circuit 40 responsive to the sound sense signal, for amplifying the sound sense signal so that the amplified sound sense signal may be more readily filtered and timed. Filter circuit 50, responsive to the amplified sound sense signal for filtering the amplified sound sense signals by attenuating wave components having frequencies greater than those which correspond to sound having the frequency of about one hertz and attenuating wave components having frequencies less than those which correspond to sound having the frequency of about one hertz. The filtered sound sense signal is sinusoidal in shape and modifying the shape of the filtered sound sense signal more readily allows counting the number of filtered sound sense signal cycles which is directly related to the number of infrasound pulses sensed and to the duration of the sound sense signal. Timer circuit 140 responsive to the filtered sound sense signal for timing the duration of the sound sense signal and providing the timed sound sense signal. Timer circuit 140 including counter circuit 70 responsive to clipper circuit 60 in the present example. Clipper circuit 60 is responsive to the filtered sound sense signal. Clipper circuit 60 receives the filtered sound sense signal which is sinusoidal in shape and clips the signal peaks and valleys thus producing the squared sound sense signal that is approximately square wave shaped. The squared sound sense signal having sharp squared edges that can be used to increment counter circuit 70 which counts the number of squared sound sense signal cycles and provides the timed sound sense signal when the predetermined count is reached which in this example is 64. Mid-frequency radio frequency detector 110 is tuned to detect radio frequency electromagnetic waves having the frequency of about 550 kilohertz. Analyzer circuit 120 responsive to the radio frequency detection signal integrates the radio frequency detection signal to provide the analyzed radio frequency signal. Tornadoes emit nearly continuous radio frequency electromagnetic waves, the integrator determines whether the radio frequency detection signal has the nearly rearly continuous pattern that is tornado-like in nature. Trigger circuit 80 is activated in the event of two conditions, the first trigger condition being when the predetermined number of cycles of the squared sound sense signal has been counted, which in this example is 64, and the second trigger condition being the simultaneous sensing of filtered sound sense signal and analyzed radio frequency signal. When trigger circuit 80 is activated the trigger signal is sent to latch 91 which enables the latch signal to be sent to audio alarm 101 thus generating the alarm signal.

Figure 5:
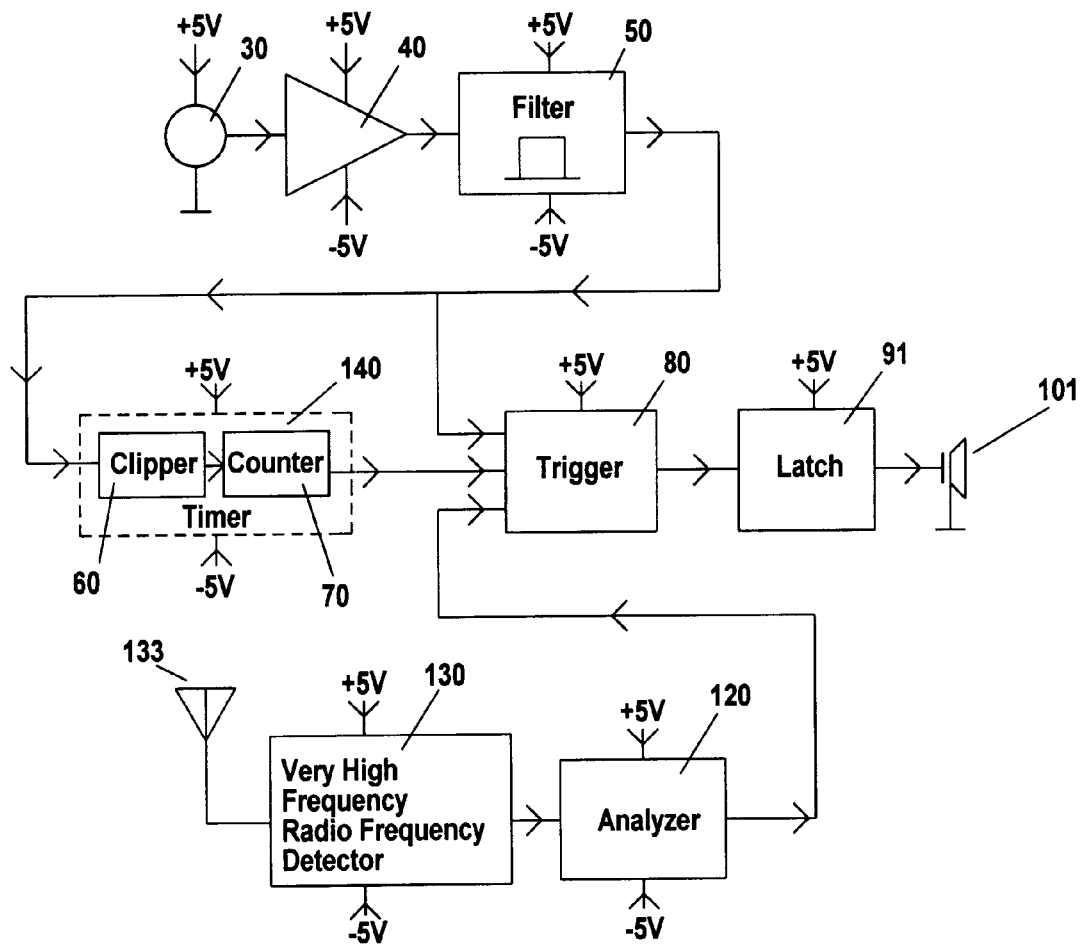
FIG. 5 is a block diagram of a tornado identification circuit for a third embodiment of the infrasound tornado detector that includes a very high frequency radio frequency detector.
Figure 5:
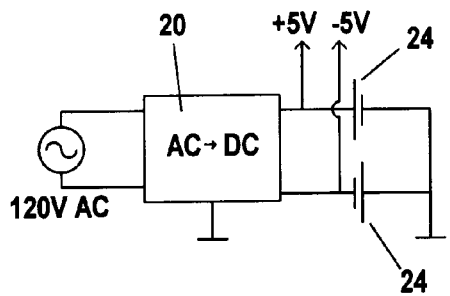
Figure 6:
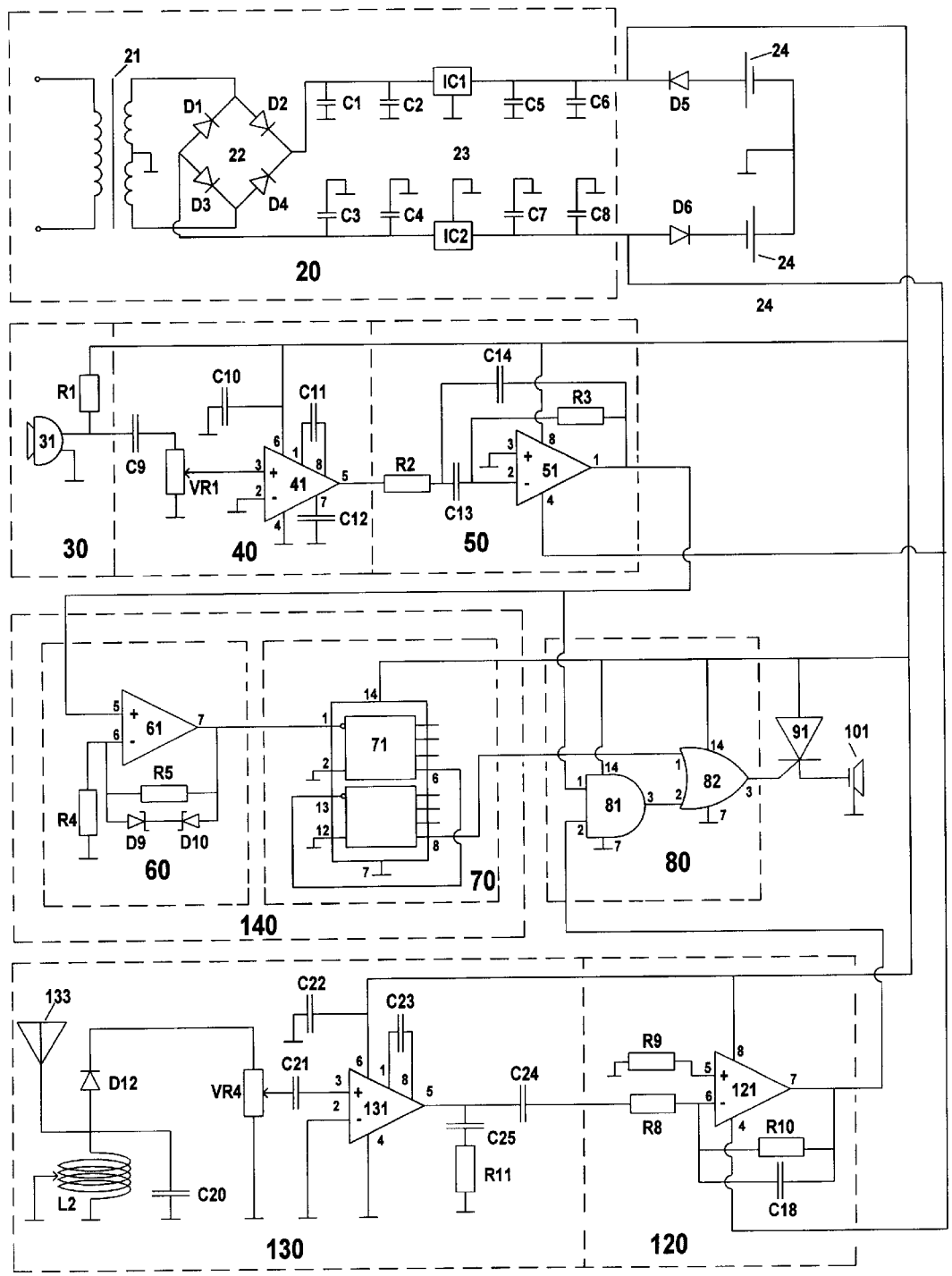
FIG. 6 is a detailed diagram of the tornado identification circuit of FIG. 5.

Infrasound and Very High Frequency—Radio Frequency Tornado Detector—Description, FIGS. 5 and 6

As shown in FIG. 5, the Infrasound tornado detector has infrasound sensor circuit 30, which acts as the infrasound sensor that can sense in the frequency range of about one hertz and provides the sound sense signal in response thereto. Amplifier circuit 40 responsive to infrasound sensor circuit 30 for amplifying the sound sense signal received from infrasound sensor circuit 30 so that the amplified sound sense signal may be more readily filtered and timed. Filter circuit 50 responsive to amplifier circuit 40 for filtering the amplified sound sense signal by attenuating wave components having frequencies greater than those which correspond to sound having the frequency of about one hertz and by attenuating wave components having frequencies less than those which correspond to sound having the frequency of about one hertz. Timer circuit 140 responsive to filter circuit 50 for timing the duration of the sound sense signal and providing the timed sound sense signal. Timer circuit 140 including counter circuit 70 responsive to clipper circuit 60 in the present example. Clipper circuit 60 responsive to filter circuit 50 for receiving the filtered sound sense signal which is sinusoidal in shape and squaring the signal by clipping the signal peaks and valleys producing the squared sound sense signal that is approximately square wave shaped. Counter circuit 70 responsive to clipper circuit 60 for counting the number of cycles of the squared sound sense signal by incrementing based on the sharp squared edges of the squared sound sense signal and providing the timed sound sense signal when the predetermined count has been reached, which in this example is 64. A very high frequency radio frequency detector circuit 130 tuned to about 53.25 megahertz to detect radio frequency electromagnetic wave emissions from tornadoes. Analyzer circuit 120 responsive to very high frequency radio frequency detector circuit 130 for integrating the radio frequency detection signal received from very high frequency radio frequency detector circuit 130 and providing the analyzed radio frequency signal when the integration value of the integrator reaches a predetermined value. Trigger circuit 80 receives inputs from clipper circuit 60, counter circuit 70 and analyzer circuit 120. Trigger circuit 80 is activated in the event of two conditions, the first trigger condition being when the predetermined number of cycles of the squared sound sense signal has been counted, which in this example is 64, and the second trigger condition being the simultaneous sensing of filtered sound sense signal and analyzed radio frequency signal. Latch 91 responsive to trigger circuit 80 for latching and conducting the latch signal when the trigger signal is received from trigger circuit 80. Audio alarm 101 responsive to latch 91 for generating the alarm signal. Batteries 24 connected in parallel to AC-DC converter 20 power these pieces of equipment. AC-DC converter 20 having the receptacle to plug into the AC power supply.

As shown in more detail in FIG. 6, the AC-DC converter includes transformer 21, rectifier circuit 22 and voltage regulation circuit 23 including smoothing capacitors C1–C8, LM340T-5.0 circuit IC1 and LM79M05 circuit IC2. Those skilled in the art will appreciate that the respective capacity and resistance values and part identifiers for the components of the AC-DC converter and battery back-up portions of AC-DC converter 20 are optional and form no part of the invention. AC-DC converter 20 includes transformer 21, the transformer secondary winding being center tapped and connected to ground. The first leg of the center tapped secondary winding is connected to the cathode of diode D1, which in this example is a 1N4001 and to the anode of diode D2, which in this example is a 1N4001. The second leg of the center tapped secondary winding is connected to the cathode of diode D3, which in this example is a 1N4001 and to the anode of diode D4, which in this example is a 1N4001. Anode of diode D1 is connected to the anode of diode D3, the diode inter-anode connection being tapped and forming the negative voltage leg of the power supply. The cathode of diode D2 and cathode of diode D4 are connected, the diode inter-cathode connection being tapped and forming the positive leg of the power supply. Capacitors C1 (100 $\mu$F), C2

(0.1 μF), C5 (22 μF), C6 (0.1 μF) and positive voltage regulator circuit IC1 (LM340T-5.0) forming the voltage regulation circuit for the positive leg of the power supply. Capacitors C1, C2, C5 and C6 each having their first terminal connected to the positive leg of the power supply and each having their second terminal connected to ground. Positive voltage regulator circuit IC1 being connected to the positive leg of the power supply and positive voltage regulator circuit IC1 having the ground connection. Capacitors C3 (100 μF), C4 (0.1 μF), C7 (22 μF), C8 (0.1 μF) and negative voltage regulator circuit IC2 (LM79M05) forming the voltage regulation circuit for the negative leg of the power supply. Capacitors C3, C4, C7 and C8 each having their first terminal connected to the negative leg of the power supply and each having their second terminal connected to ground. Negative voltage regulator circuit IC2 being connected to the negative leg of the power supply. Negative voltage regulator IC2 having the ground connection connected to ground. The cathode of diode D5, which in this example is an 1N4001, is connected to the positive leg of the power supply, the anode of diode D5 is connected to the positive terminal of the first battery of batteries 24. The anode of diode D6, which in this example is an 1N4001, is connected to the negative leg of the power supply, the cathode of diode D6 is connected to the negative terminal of the second battery of batteries 24. The negative terminal of the first battery of batteries 24 and the positive terminal of the second battery of batteries 24 being connected forming the inter-battery connection, the inter-battery connection being tapped and being connected to ground. The positive leg of the power supply is tapped for use by the tornado detector circuit between the cathode of diode D5 and the positive leg of the power supply. The negative leg of the power supply is tapped for use by the tornado detector circuit between the anode of diode D6 and the negative leg of the power supply. The incoming infrasound signal is received by condenser microphone 31, which in the illustrated example is the Panasonic omnidirectional back electret condenser microphone cartridge model number WM-60AT, that is able to sense in the infrasound range of about one hertz. Condenser microphone 31 has two connections, the ground connection and the power connection. The microphone ground connection is connected to ground, the microphone power connection is connected to the first terminal of resistor R1 (2.2K), the second terminal of resistor R1 is connected to positive voltage output by AC-DC converter 20 or batteries 24. The purpose of the resistor is to reduce the voltage supplied to condenser microphone 31. The microphone power connection is additionally connected to the first terminal of capacitor C9 (1 μF), the purpose of capacitor C9 is to pass fluctuating AC signals but not DC signals. The second terminal of capacitor C9 is connected to the first terminal of potentiometer VR1 (10K). The second terminal of potentiometer VR1 is connected to ground, the wiper terminal of potentiometer VR1 is connected to the non-inverting input of audio amplifier 41, which in the present example is the LM386N 400 mW audio amplifier. Potentiometer VR1 shunts a portion of the voltage to ground and part to the non-inverting input of audio amplifier 41 depending on the position of the wiper. The inverting input of audio amplifier 41 is connected to ground so that the voltage amplified is the voltage difference between ground and the voltage at the wiper of potentiometer VR1. Power supply connection of audio amplifier 41 is connected to positive voltage output by AC-DC converter 20 or batteries 24, the power supply connection has parallel connections to the first terminal of capacitor C10 (33 μF).

The second terminal of capacitor C10 is connected to ground. The ground connection of audio amplifier 41 is connected to ground. The first gain connection of audio amplifier 41 is connected to the first terminal of capacitor C11 (10 μF), the second gain connection of audio amplifier 41 is connected to the second terminal of capacitor C11. The bypass connection of audio amplifier 41 is connected to the first terminal of capacitor C12 (0.05 μF), the second terminal of capacitor C12 is connected to ground. Operational amplifier configured as band pass filter 51, which in this example is the LM1458N dual operational amplifier configured as the band pass filter is responsive to audio amplifier 41. The output of audio amplifier 41 is connected to the first terminal of resistor R2 (15K), the second terminal of resistor R2 is connected to the first terminal of two parallel capacitors, capacitor C13 (10 μF) and capacitor C14 (10 μF). The second terminal of the capacitor C13 is connected to the inverting input of the operational amplifier configured as band pass filter 51. The first terminal of resistor R3 (330K) is connected to the inverting input of the operational amplifier configured as band pass filter 51. The second terminal of resistor R3 is connected to the output of the operational amplifier configured as band pass filter 51, the second terminal of capacitor C14 is connected to the output of the operational amplifier configured as band pass filter 51. The non-inverting input of the band pass filtering operational amplifier is connected to ground. Power for the operational amplifier configured as band pass filter 51 is provided by voltage output from AC-DC converter 20, or batteries 24. The output of the operational amplifier configured as band pass filter 51 is connected to the non-inverting input of the operational amplifier configured as signal clipper 61 which in this example is the LM1458N dual operational amplifier configured to clip and amplify the filtered sound sense signal. The inverting input terminal of the operational amplifier configured as signal clipper 61 is connected to the anode of zener diode D9, which in this example is an 1N4729A, the cathode of zener diode D9 is connected to the cathode of zener diode D10, which in this example is a 1N4729A, the anode of zener diode D10 being connected to the output of the operational amplifier configured as signal clipper 61. The first terminal of resistor R5 (10K) is connected to the anode of zener diode D9. The second terminal of resistor R5 is connected to the anode of zener diode D10. The inverting input terminal of the clipping operational amplifier is additionally connected to the first terminal of resistor R4 (1K), the second terminal of the resistor R4 is connected to ground. The output of the operational amplifier configured as signal clipper 61 is connected to the first clock pulse input of dual 4-bit binary ripple counter 71 which in this example is the 74HCT393. The first output of the dual 4-bit binary ripple counter is connected to the second clock pulse input of dual 4-bit binary ripple counter 71. The master reset of both counters of dual 4-bit binary ripple counter 71 are connected to ground. Dual 4-bit binary counter 71 is connected to positive voltage output by AC-DC converter 20, or batteries 24. The ground connection of the dual 4-bit binary counter is connected to ground. Those skilled in the art will appreciate that a variety of circuits are available which may detect radio frequency waves and that the specific circuitry described is exemplary in nature and should not be limiting. Very high frequency radio frequency detector circuit 130 includes an antenna 133 connected to a first terminal of a tapped inductor L2 (0.6 H), a first terminal of a capacitor C20 (15 pF) and to an anode of a germanium diode D12, which in this example is an 1N34A, available from Tandy Corporation, having an address of Ft. Worth, Tex. 76102.

Said tapped inductor L2 having a second terminal connected to ground, and an inductor tap being connected to ground. Said capacitor C20 having a second terminal connected to ground. A cathode of germanium diode D12 is connected to a first terminal of a potentiometer VR4 (10K), a second terminal of potentiometer VR4 is connected to ground. A wiper of potentiometer VR4 is connected to a first terminal of a capacitor C21 (0.1 µF), a second terminal of capacitor C21 is connected to a non-inverting input of an audio amplifier 131, which in the present example is an LM386N 400 mW audio amplifier, manufactured by National Semiconductor Corporation, having an address of 2900 Semiconductor Drive, Santa Clara, Calif. 95052-8090. An inverting input of audio amplifier 131 is connected to ground. A ground connection of audio amplifier 131 is connected to ground. A power supply connection of audio amplifier 131 is connected in parallel to positive voltage output by AC-DC converter 20, or batteries 24, and a first terminal of a capacitor C22 (220 µF). A second terminal of capacitor C22 is connected to ground. A first gain connection of audio amplifier 131 is connected to a first terminal of a capacitor C23 (10 µF). A second gain connection of audio amplifier 131 is connected to a second terminal of capacitor C23. An output of audio amplifier 131 is connected to a first terminal of a capacitor C25 (0.047 µF), a second terminal of capacitor C25 is connected to a first terminal of a resistor R11 (10k), a second terminal of resistor R11 is connected to ground. The output of audio amplifier 131 is connected to a first terminal of a capacitor C24 (220 µF). Analyzer circuit 120 integrates the radio frequency signal that is detected by very high frequency radio frequency detector circuit 130. Said analyzer circuit 120 includes the operational amplifier configured as integrator circuit 121, which in this example is the LM1458N dual operational amplifier configured as the integrator. The non-inverting input of the integrating operational amplifier circuit 121 is connected to the first terminal of resistor R9 (4.7K), the second terminal of resistor R9 is connected to ground. The inverting input of the integrating operational amplifier circuit 121 is connected to the first terminal of resistor R8 (4.7K); the second terminal of resistor R8 is connected to a second terminal of capacitor C24. The inverting input of integrating operational amplifier circuit 121 is connected to the first terminal of resistor R10 (47K) the second terminal of resistor R10 is connected to the output of the integrating operational amplifier circuit 121. The first terminal of capacitor C18 (1 µF) is connected to the first terminal of resistor R10, the second terminal of capacitor C18 is connected to the second terminal of resistor R10. The power connection of integrating operational amplifier circuit 121 is connected to voltage output of AC-DC converter 20, or batteries 24. Trigger circuit 80 includes AND gate 81, which in this example is the 74HCT08 quad 2-input AND gate, the first input of AND gate 81 being connected to the output from the operational amplifier configured as band pass filter 51. The second input of AND gate 81 is connected to the output of the integrating operational amplifier circuit 121. The power supply connection of AND gate 81 is connected to positive voltage output by AC-DC converter 20 or batteries 24. The ground connection terminal of the AND gate is connected to ground. Trigger circuit 80 additionally includes OR gate 82, which in this example is the 74HCT32 quad 2-input OR gate that has the first input connected to the second output of dual 4-bit binary ripple counter 71. The second input of OR gate 82 is connected to the output from AND gate 81. The power supply connection of OR gate 82 is connected to positive voltage output by AC-DC converter 20 or batteries 24. The ground connection terminal of OR gate 82 is connected to ground. The output of OR gate 82 is connected to the gate of latch 91. The anode of latch 91 is connected to positive voltage output by AC-DC converter 20 or batteries 24. The cathode of latch 91 is connected to the power connection of audio alarm 101 and the ground connection of audio alarm 101 is connected to ground.

Infrasound and Very High Frequency—Radio Frequency Tornado Detector—Operation, FIGS. 5 and 6

Operation of the device of the present invention will be described further with reference to FIG. 5. Tornadoes emit very low frequency sound that is referred to as infrasound; specifically this frequency is about one hertz. Tornadoes also emit very high frequency radio frequency electromagnetic waves having the frequency of about 53.25 megahertz. This embodiment of the present invention detects both very low frequency sounds, about one hertz, and very high frequency radio frequency electromagnetic waves, about 53.25 megahertz, both of which are associated with tornadoes. This embodiment of the invention alarms when the predetermined number of infrasound oscillations has been counted or when infrasound emissions and very high frequency radio frequency electromagnetic emissions are simultaneously detected.

As indicated in FIG. 5, infrasound is detected by infrasound sensor circuit 30 capable of sensing the presence of sound having the frequency of about one hertz and generating the sound sense signal in response thereto. Amplifier circuit 40 responsive to the sound sense signal, for amplifying sound sense signals so that the amplified sound sense signal may be more readily filtered and timed. Filter circuit 50 responsive to the amplified sound sense signal for filtering the amplified sound sense signal by attenuating wave components having frequencies greater than those which correspond to sound having the frequency of about one hertz and by attenuating wave components having frequencies less than those which correspond to sound having the frequency of about one hertz. The filtered sound sense signal is sinusoidal in shape and modifying the shape of the filtered sound sense signal more readily allows counting the number of filtered sound sense signal cycles which is directly related to the number of infrasound pulses sensed and to the duration of the sound sense signal. Timer circuit 140 is responsive to the filtered sound sense signal for timing the duration of the sound sense signal and providing the timed sound sense signal. Timer circuit 140 including counter circuit 70 responsive to clipper circuit 60 in the present example. Clipper circuit 60 responsive to the filtered sound sense signal, clips the peaks and valleys of the filtered sound sense signal which is sinusoidal in shape thus providing the squared sound sense signal that is approximately square wave shaped. The squared sound sense signal having sharp squared edges that can be used to increment counter circuit 70 which counts the number of cycles of the squared sound sense signal and provides the timed sound sense signal when the predetermined count is reached which in this example is 64. Very high frequency radio frequency detector circuit 130 is tuned to detect radio frequency electromagnetic waves having the frequency of about 53.25 megahertz and provide the radio frequency detection signal. Analyzer circuit 120 responsive to the radio frequency detection signal integrates the signal to provide the analyzed radio frequency signal. Tornadoes emit nearly continuous radio frequency electromagnetic waves, the analyzer determines whether the radio frequency detection signal has the continuous pattern that is tornado-like in nature. Trigger circuit 80 is activated in the event of two conditions, the first condition being when the predetermined number of squared sound sense signal cycles have been counted, which in this example is 64, and the second condition being the simultaneous sensing of filtered sound sense signal and analyzed radio frequency signal. When trigger circuit 80 is activated the trigger signal is sent to latch 91 which enables the latch signal to be sent to audio alarm 101 thus generating the alarm signal.

Summary, Ramifications, and Scope

Accordingly, it can be seen that according to the invention, we have provided a tornado detector, which senses infrasound emissions of tornadoes and generates the alarm signal, thus providing advanced warning of the approach of tornadoes. The detector is compact, self contained and simple to install.

Although the description above contains much specificity, these should not be construed as limiting the scope of the invention but as merely providing illustrations of some of the presently preferred embodiments of this invention. Various other embodiments and ramifications are possible within the teaching of the invention.

For example, the microphone capable of sensing infrasound may be substituted with a membrane configured to have a major resonance frequency of 1 hertz and a capacitive, strain or light responsive sensor able to detect its movement. The microphone may be replaced with an enclosure configured with a tube inlet such that the unit filters out sound other than that in the range of about one hertz and a sensor consisting of a thermocouple, thermistor or microphone capable of sensing air movement through the communicating tube. The electrical filter may be replaced with the enclosure configured with the tube inlet such that the unit filters out sound other than that in the range of about one hertz and placing the microphone physically within the enclosure. The electrical filter may be replaced with a low-pass filter having a cutoff of about one hertz or by a passive filtering circuit. A digital signal processor or a microprocessor may also perform the filter function. The amplifier may be omitted or may be combined with another component such as the filter circuit or the clipper circuit. The clipper circuit is not altogether absolutely necessary, as it is possible to measure the duration of the infrasound signal by means other than counting the sharp edge of signals. A circuit that generates a spike voltage during a portion of the sound sense signal to advance the counter may also replace the clipper circuit. A digital signal processor or microprocessor may also perform the clipping function. The timer circuit function may be done by timing the length of time that the one hertz frequency sound has been sensed. The counter circuit function may be achieved by means other than direct counting of signal edges, such as the charging of a capacitive circuit that triggers when the predetermined number of cycles has been detected which in this example is 64. The counting or timing function may also be performed with a digital signal processor or a microprocessor. The trigger circuit may be replaced by equivalent Boolean logic. Digital signal processor or microprocessor may perform the trigger function. Any device that triggers a current or voltage output upon a signal activating the gate may replace the latch circuit. A piezoelectric transducer may replace the audio alarm speaker. A circuit that determines non-sporadic nature of the received radio frequency electromagnetic wave signal may replace the radio frequency electromagnetic wave detector analyzer. In the examples given the analyzer was the integration circuit. The integration circuit may be replaced with a circuit that analyzes the time varying nature of the detected radio frequency electromagnetic wave, such as average detection levels or root mean square detection levels. A digital signal processor or microprocessor may perform the analysis function. A digital signal processor or microprocessor performing approximately equivalent functions may perform many of the non-sensor functions. In addition the detector may contain a reset function that disables the alarm signal for a specified time interval. The detector may also contain the energy source that could power the tornado detector in the event of loss of electrical power, means for indicating reduction in the available energy from the energy source, means for indicating the absence of the energy source and means for indicating operational power. The detector may additionally contain means to self-test the detector by providing the electrical conditions that would simulate the electrical output of the sensor conditions in the event of tornadoes within the sensor range. An additional embodiment of the tornado detector would be the inclusion of both 550 kilohertz radio frequency electromagnetic detection and 53.25 megahertz radio frequency electromagnetic detection in addition to infrasound sensing.

Thus the scope of the invention should be determined by the appended claims and their legal equivalents, rather than by the examples given.

What is claimed is:

1. A method of detecting tornadoes, comprising the steps of:
   sensing the presence of sound in air having a frequency of about one hertz and providing a sound sense signal in response thereto; and
   generating an alarm signal in response to said sound sense signal.

2. A method of detecting tornadoes, comprising the steps of:
   sensing the presence of sound in air having a frequency of about one hertz and providing a sound sense signal in response thereto;
   bandpass filtering to attenuate said sound sense signal wave components having frequencies greater than those which correspond to sound having a frequency of about one hertz and to attenuate said sound sense signal wave components having frequencies less than those which correspond to sound having a frequency of about one hertz; and
   generating an alarm signal in response to said filtered sound sense signal.

3. A method of detecting tornadoes, comprising the steps of:
   sensing the presence of sound in air having a frequency of about one hertz and providing a sound sense signal in response thereto;
   bandpass filtering to attenuate said sound sense signal wave components having frequencies greater than those which correspond to sound having a frequency of about one hertz and to attenuate said sound sense signal wave components having frequencies less than those which correspond to sound having a frequency of about one hertz;
   timing said filtered sound sense signal; and
   generating an alarm signal in response to said timed sound sense signal.

4. A method of detecting tornadoes as recited in claim 3, wherein said step of timing the filtered sound sense signal comprises the step of:
   counting responsive to said filtered sound sense signal for providing a timed sound sense signal when a predetermined count is reached.

5. A method of detecting tornadoes, comprising the steps of:
   sensing the presence of sound in air having a frequency of about one hertz and providing a sound sense signal in response thereto;

amplifying said sound sense signal;

bandpass filtering to attenuate said amplified sound sense signal wave components having frequencies greater than those which correspond to sound having a frequency of about one hertz and to attenuate said amplified sound sense signal wave components having frequencies less than those which correspond to sound having a frequency of about one hertz;

producing a squared version of said filtered sound sense signal;

counting responsive to said squared sound sense signal for providing a timed sound sense signal when a predetermined count is reached;

latching in response to said timed sound sense signal; and generating an audible alarm signal in response to said latch signal.

6. A method of detecting tornadoes as recited in claim 5, further comprising the steps of:

detecting the tuned presence of radio frequency electromagnetic waves having a frequency of about 550 kilohertz and generating a radio frequency detection signal in response thereto;

analyzing said radio frequency detection signal to determine the presence of continuous radio frequency electromagnetic waves; and wherein said step of latching is additionally responsive to the simultaneous presence of said filtered sound sense signal and said analyzed radio frequency signal.

7. A method of detecting tornadoes as recited in claim 5, further comprising the steps of:

detecting the tuned presence of radio frequency electromagnetic waves having a frequency of about 53.25 megahertz and generating a radio frequency detection signal in response thereto;

analyzing said radio frequency detection signal to determine the presence of continuous radio frequency electromagnetic waves; and wherein said step of latching is additionally responsive to the simultaneous presence of said filtered sound sense signal and said analyzed radio frequency signal.

8. A method of detecting tornadoes as recited in claim 5, further comprising the steps of:

detecting the tuned presence of radio frequency electromagnetic waves having frequencies of about 550 kilohertz and about 53.25 megahertz and generating a radio frequency detection signal in response thereto;

analyzing said radio frequency detection signal to determine the presence of continuous radio frequency electromagnetic waves; and wherein said step of latching is additionally responsive to the simultaneous presence of said filtered sound sense signal and said analyzed radio frequency signal.

9. Apparatus for detecting tornadoes, comprising:

a sensor for sensing the presence of sound in air having a frequency of about one hertz and for providing a sound sense signal in response thereto; and an alarm for generating an alarm signal in response to said sound sense signal.

10. Apparatus for detecting tornadoes, comprising:

a sensor for sensing the presence of sound in air having a frequency of about one hertz and for providing a sound sense signal in response thereto; and means for generating an alarm signal in response to said sound sense signal.

11. Apparatus for detecting tornadoes, comprising:

a sensor for sensing the presence of sound in air having a frequency of about one hertz and for providing a sound sense signal in response thereto;

a bandpass filter to attenuate said sound sense signal wave components having frequencies greater than those which correspond to sound having a frequency of about one hertz and to attenuate said sound sense signal wave components having frequencies less than those which correspond to sound having a frequency of about one hertz; and an alarm for generating an alarm signal in response to said filtered sound sense signal.

12. Apparatus for detecting tornadoes, comprising:

a sensor for sensing the presence of sound in air having a frequency of about one hertz and for providing a sound sense signal in response thereto;

means for bandpass filtering to attenuate said sound sense signal wave components having frequencies greater than those which correspond to sound having a frequency of about one hertz and to attenuate said sound sense signal wave components having frequencies less than those which correspond to sound having a frequency of about one hertz; and means for generating an alarm signal in response to said filtered sound sense signal.

13. Apparatus for detecting tornadoes, comprising:

a sensor for sensing the presence of sound in air having a frequency of about one hertz and for providing a sound sense signal in response thereto;

a bandpass filter to attenuate said sound sense signal wave components having frequencies greater than those which correspond to sound having a frequency of about one hertz and to attenuate said sound sense signal wave components having frequencies less than those which correspond to sound having a frequency of about one hertz;

a timer for timing said filtered sound sense signal; and an alarm for generating an alarm signal in response to said timed sound sense signal.

14. Apparatus for detecting tornadoes as recited in claim 13, wherein said timer comprises:

a counter for counting responsive to said filtered sound sense signal and providing a timed sound sense signal when a predetermined count is reached.

15. Apparatus for detecting tornadoes, comprising:

a sensor for sensing the presence of sound in air having a frequency of about one hertz and for providing a sound sense signal in response thereto;

means for bandpass filtering to attenuate said sound sense signal wave components having frequencies greater than those which correspond to sound having a frequency of about one hertz and to attenuate said sound sense signal wave components having frequencies less than those which correspond to sound having a frequency of about one hertz;

means for timing said filtered sound sense signal; and means for generating an alarm signal in response to said timed sound sense signal.

16. Apparatus for detecting tornadoes as recited in claim 15, wherein said means for timing the filtered sound sense signal comprises;

means for counting responsive to said filtered sound sense signal for providing a timed sound sense signal when a predetermined count is reached.

17. Apparatus for detecting tornadoes, comprising:

a sensor for sensing the presence of sound in air having a frequency of about one hertz and for providing a sound sense signal in response thereto;

means for amplifying said sound sense signal;

means for bandpass filtering to attenuate said amplified sound sense signal wave components having frequencies greater than those which correspond to sound having a frequency of about one hertz and to attenuate said amplified sound sense signal wave components having frequencies less than those which correspond to sound having a frequency of about one hertz;

means for producing a squared version of said filtered sound sense signal;

means for counting responsive to said squared sound sense signal for providing a timed sound sense signal when a predetermined count is reached;

means for latching in response to said timed sound sense signal; and means for generating an audible alarm signal in response to said latch signal.

18. Apparatus for detecting tornadoes as recited in claim 17, further comprising:

means for detecting the tuned presence of radio frequency electromagnetic waves having a frequency of about 550 kilohertz and for generating a radio frequency detection signal in response thereto;

means for analyzing said radio frequency detection signal to determine the presence of continuous radio frequency electromagnetic waves; and wherein said latching means is responsive to;

AND gate means responsive to said filtered sound sense signal and said analyzed radio frequency signal; and OR gate means responsive to the output of said AND gate means and said timed sound sense signal.

19. Apparatus for detecting tornadoes as recited in claim 17, further comprising:

means for detecting the tuned presence of radio frequency electromagnetic waves having a frequency of about 53.25 megahertz and for generating a radio frequency detection signal in response thereto;

means for analyzing said radio frequency detection signal to determine the presence of continuous radio frequency electromagnetic waves; and wherein said latching means is responsive to;

AND gate means responsive to said filtered sound sense signal and said analyzed radio frequency signal; and OR gate means responsive to the output of said AND gate means and said timed sound sense signal.

20. Apparatus for detecting tornadoes as recited in claim 17, further comprising:

means for detecting the tuned presence of radio frequency electromagnetic waves having a frequency of about 550 kilohertz and about 53.25 megahertz and for generating a radio frequency detection signal in response thereto;

means for analyzing said radio frequency detection signal to determine the presence of continuous radio frequency electromagnetic waves; and wherein said latching means is responsive to;

AND gate means responsive to said filtered sound sense signal and said analyzed radio frequency signal; and OR gate means responsive to the output of said AND gate means and said timed sound sense signal.

21. Apparatus for detecting tornadoes as recited in claim 17 further comprising:

means for generating a visual alarm signal responsive to said latch signal.

22. Apparatus for detecting tornadoes as recited in claim 17, further comprising:

means for resetting the tornado detector wherein said means for generating an alarm signal is deactivated for a specified time interval.

23. Apparatus for detecting tornadoes as recited in claim 17, further comprising:

an energy source connected to said tornado detector for supplying power to said tornado detector in the event of interruption of external alternating current power.

24. Apparatus for detecting tornadoes as recited in claim 17, further comprising:

self-test means connected to said tornado detector for electronically simulating the sensor electrical output signals indicative of a tornado.

25. Apparatus for detecting tornadoes, comprising:

a sensor for sensing the presence of sound in air having a frequency of about one hertz and for providing a sound sense signal in response thereto;

an amplifier for amplifying said sound sense signal;

a bandpass filter to attenuate said amplified sound sense signal wave components having frequencies greater than those which correspond to sound having a frequency of about one hertz and to attenuate said amplified sound sense signal wave components having frequencies less than those which correspond to sound having a frequency of about one hertz;

a clipper for producing a squared version of said filtered sound sense signal;

a counter for counting responsive to said squared sound sense signal for providing a timed sound sense signal when a predetermined count is reached;

a latch for latching in response to said timed sound sense signal; and an alarm for generating an audible alarm signal in response to said latch signal.

26. Apparatus for detecting tornadoes as recited in claim 25, further comprising:

a radio frequency detector tuned for detecting the presence of radio frequency electromagnetic waves having a frequency of about 550 kilohertz;

an analyzer for analyzing the radio frequency detection signal to determine the presence of continuous radio frequency electromagnetic waves; and wherein said latch is additionally responsive to the simultaneous presence of the filtered sound sense signal and said analyzed radio frequency signal.

27. Apparatus for detecting tornadoes as recited in claim 25, further comprising:

a radio frequency detector tuned for detecting the presence of radio frequency electromagnetic waves having a frequency of about 53.25 megahertz and for generating a radio frequency detection signal in response thereto;

an analyzer for analyzing said radio frequency detection signal to determine the presence of continuous radio frequency electromagnetic waves; and wherein said latch is additionally responsive to the simultaneous presence of said filtered sound sense signal and said analyzed radio frequency signal.

28. Apparatus for detecting tornadoes as recited in claim 25, further comprising:

a radio frequency detector tuned for detecting the presence of radio frequency electromagnetic waves having a frequencies of about 550 kilohertz and about 53.25 megahertz and for generating a radio frequency detection signal in response thereto;

an analyzer for analyzing said radio frequency detection signal to determine the presence of continuous radio frequency electromagnetic waves;

wherein said latch is additionally responsive to the simultaneous presence of said filtered sound sense signal and said analyzed radio frequency signal.

* * * * *